United States Patent
Katai et al.

(10) Patent No.: US 7,507,435 B2
(45) Date of Patent: Mar. 24, 2009

(54) SLITTER APPARATUS AND PRODUCTION METHOD OF ELECTRODE

(75) Inventors: Kazuo Katai, Tokyo (JP); Yousuke Miyaki, Tokyo (JP); Seiichi Endo, Tokyo (JP)

(73) Assignee: TDK Corporation, Tokyo (JP)

( * ) Notice: Subject to any disclaimer, the term of this patent is extended or adjusted under 35 U.S.C. 154(b) by 477 days.

(21) Appl. No.: 11/166,262

(22) Filed: Jun. 27, 2005

(65) Prior Publication Data

US 2006/0016308 A1    Jan. 26, 2006

(30) Foreign Application Priority Data

Jun. 29, 2004   (JP)   ............................ P2004-192203

(51) Int. Cl.
*B05D 5/12*    (2006.01)
*B05D 3/12*    (2006.01)

(52) U.S. Cl. ..................... 427/115; 427/58; 427/289; 427/383.1

(58) Field of Classification Search .................... 427/58, 427/115, 289, 383.1
See application file for complete search history.

(56) References Cited

U.S. PATENT DOCUMENTS 6,524,742 B1 *   2/2003   Emanuel et al. .............. 429/129

FOREIGN PATENT DOCUMENTS

| JP | A-5-190200 | 7/1993 |
| JP | A-8-45500 | 2/1996 |
| JP | A-11-144713 | 5/1999 |

* cited by examiner

*Primary Examiner*—Brian K Talbot
(74) *Attorney, Agent, or Firm*—Oliff & Berridge, PLC

(57) ABSTRACT

An electrode production method has an active-material-containing layer forming step of applying an electrode-forming coating solution containing an electrode active material, a binder capable of binding the electrode active material, and a liquid capable of dissolving or dispersing the binder, onto a collector sheet, and thereafter removing the liquid to form an active-material-containing layer on the collector, thereby obtaining a electrode sheet; and an electrode forming step of cutting the electrode sheet with a slitter apparatus to obtain an electrode.

2 Claims, 5 Drawing Sheets

SLITTER APPARATUS AND PRODUCTION METHOD OF ELECTRODE

BACKGROUND OF THE INVENTION

1. Field of the Invention

The present invention relates to a slitter apparatus for slitting a sheetlike object in a predetermined width, and a method of producing an electrode with the same.

2. Related Background Art

With recent reduction in size and weight of electronic devices such as various office automation equipment, VTR cameras, and cell phones, there are demands for reduction in size and weight and for enhancement of performance of electrochemical devices such as secondary batteries and electrochemical capacitors used as drive power sources for these electronic devices.

Electrodes of the electrochemical devices are normally produced as follows: an electrode active material is mixed with a binder to prepare a coating solution for formation of electrodes, this coating solution is applied onto one surface or both surfaces of a collector, the coating solution is dried to form an active-material-containing layer on one surface or both surfaces of the collector to obtain a sheetlike electrode, thereafter the sheetlike electrode is rolled, and it is cut in a predetermined size.

The cutting operation in production of electrodes is normally comprised of a slitting step of cutting the sheetlike electrode along the direction of flow of production and in a predetermined width, and a clipping step of cutting the electrode of the predetermined width in a predetermined length.

The cutting of the electrode in the slitting step is usually carried out with a slitter apparatus of a shear method, a gang method, or the like. This slitter apparatus has a rotary shaft provided with a plurality of circular upper blades at predetermined intervals, and a rotary shaft provided with a plurality of circular lower blades at predetermined intervals while the two rotary shafts are arranged in parallel with each other and at such a spacing as to achieve a predetermined engagement depth with contact between the upper blades and the lower blades. The slitter apparatus is arranged to be able to slit the sheetlike object in the predetermined width by shear force with rotation of the two rotary shafts.

Here the shear method is a method using round blades having the included angle of 85-90° and the thickness of less than 1 mm, as the upper blades. On the other hand, the gang method is a method using as the upper blades, round blades having the included angle of 90° and the thickness larger than that of the upper blades in the shear method.

The slitter apparatus is the apparatus that cuts the sheetlike object as an object to be cut, by shear force, but is not one that cuts the sheetlike object by sharp blades. For this reason, when the conventional slitter apparatus with the upper blades of the shear method or the gang method is used to cut the sheetlike electrode, there arises a problem that burrs of the collector are likely to be made at cut surfaces. A conceivable reason for it is that the cutting load from the cutting edge is scattered because of the existence of the active-material-containing layer formed on the collector, so as to result in failing to concentrate the shear force on the collector, this results in stretching the collector of metal, and burrs are produced when the collector is cut in this state.

In the case of lithium ion secondary batteries among the electrochemical devices, for example, rolled copper foil is used as the collector in the anode, and if this anode is produced by cutting the copper foil with the slitter apparatus, burrs will be produced at cut surfaces of the copper foil as described above, or cutting chips (copper powder) of the copper foil will be produced. A large burr projecting above the active-material-containing layer of the anode can break a separator and cause a trouble such as a short circuit between the anode and cathode inside the battery. In addition, the copper powder attached to the anode surface or to the edge part of the anode could also cause a similar trouble, and a cleaning step for removal of the copper powder used to be required after the cutting with the slitter apparatus. This resulted in complicating the electrode production steps and posing the problem of increase of production cost.

In order to remedy this problem, for example, Japanese Patent Application Laid-Open No. 11-144713 describes the cutting apparatus of the shear method with the upper blades having the included angle of 25°-65°. The apparatus is intended for suppressing production of burrs in cutting of the anode with the collector of copper foil through the use of such upper blades.

However, where the above-described cutting apparatus with the upper blades was used in cutting the cathode with the collector of aluminum foil, it was difficult to adequately suppress production of burrs and adhesion of aluminum to the side faces of the upper blades.

In the case of electric double layer capacitors among the electrochemical devices, aluminum foil is often used for the collector in the both anode and cathode, and thus the above problem more prominently affects characteristics of the electric double layer capacitors.

Japanese Patent Application Laid-Open No. 8-45500 describes a method of filling a substrate of a three-dimensional metal porous body with an active material and cutting it in a predetermined size, or cutting the above substrate in the predetermined size and filling it with the active material, and thereafter rolling or scraping off the periphery of the substrate to produce an electrode. This is a method of pushing the burrs produced during the cutting, to the inside, or scraping off the burrs, and making the edges of the electrode thinner, thereby preventing the burrs of the electrode from penetrating the separator and causing an internal short circuit.

In the method of rolling the periphery of the substrate after the cutting, however, a pointed burr of needle shape produced during the cutting is once forced down, but it again stands up thereafter. This burr sometimes caused an internal short circuit of the battery. In the case of scraping off the burrs from the periphery of the substrate after the cutting, a pointed chip, and the active material scraped off together with the substrate sometimes attached to the electrode surface, and caused an internal short circuit.

Furthermore, Japanese Patent Application Laid-Open No. 5-190200 describes a method of coating the peripheral edge of the electrode, together with the cut end faces, with a thermally adhesive resin, in order to remedy the problem of burrs and chips.

However, this method is also the method that covers the cut end faces with the resin after the cutting, but not one that suppresses the production of pointed burrs and chips. Therefore, there were cases where burrs or the like once forced down again stood up thereafter to penetrate the separator, and it was difficult to adequately prevent occurrence of the internal short circuit.

SUMMARY OF THE INVENTION

The present invention has been accomplished in view of the problems in the conventional technology, and an object of the present invention is to provide a slitter apparatus capable of adequately suppressing the adhesion of chips of the collector to the side faces of the upper blade and adequately suppressing the production of burrs at the cut surfaces of the collector, during the cutting of the sheetlike electrode. Another object of the present invention is to provide an electrode production method using the foregoing slitter apparatus.

The Inventors conducted elaborate research in order to achieve the above objects and discovered that the above objects could be achieved by defining the hardnesses and surface roughnesses of the upper blades and lower blades in the slitter apparatus within their respective predetermined ranges, thereby accomplishing the present invention.

Namely, a slitter apparatus of the present invention is a slitter apparatus comprising a rotary shaft provided with one or more circular upper blades at a predetermined interval, and a rotary shaft provided with one or more circular lower blades at a predetermined interval, the rotary shafts being arranged in parallel with each other and at such a spacing as to achieve a predetermined engagement depth with contact between a side face of a peripheral part of the upper blades and a side face of a peripheral part of the lower blades, wherein a thickness of the upper blades is not less than 1 mm, wherein an included angle of the upper blades is in a range of 75 to 88°, wherein hardnesses of the upper blades and the lower blades are in a range of $6.9 \times 10^3$ to $8.8 \times 10^3$ N/mm$^2$, and a difference between the hardness of the upper blades and the hardness of the lower blades is not more than $4.9 \times 10^2$ N/mm$^2$, and wherein surface roughnesses of the upper blades and the lower blades are not more than 4 μm, and a difference between the surface roughness of the upper blades and the surface roughness of the lower blades is not more than 2 μm.

Another slitter apparatus of the present invention is a slitter apparatus comprising a rotary shaft provided with one or more circular upper blades at a predetermined interval, and a shaft provided with one or more linear lower blades at a predetermined interval and in parallel, and arranged to be normal to edge faces of the lower blades, the shafts being arranged in parallel with each other and at such a spacing as to achieve a predetermined engagement depth with contact between a side face of a peripheral part of the upper blades and a side face of a peripheral part of the lower blades, wherein a thickness of the upper blades is not less than 1 mm, wherein an included angle of the upper blades is in a range of 75 to 88°, wherein hardnesses of the upper blades and the lower blades are in a range of $6.9 \times 10^3$ to $8.8 \times 10^3$ N/mm$^2$, and a difference between the hardness of the upper blades and the hardness of the lower blades is not more than $4.9 \times 10^2$ N/mm$^2$, and wherein surface roughnesses of the upper blades and the lower blades are not more than 4 μm, and a difference between the surface roughness of the upper blades and the surface roughness of the lower blades is not more than 2 μm.

In the present invention, the hardnesses mean values obtained as follows: Vickers hardnesses (Hv) are measured at twenty points with a Vickers hardness tester having a diamond square-based pyramid indenter, and an arithmetic average of measured values is calculated to obtain each hardness.

In the present invention, the surface roughnesses mean values obtained as follows: arithmetic average roughnesses (Ra) are measured at twenty points on the basis of JIS B0601, and an arithmetic average of measured values is calculated to obtain each surface roughness.

In the slitter apparatus of the present invention, the hardnesses of the upper blades and lower blades are in the range of $6.9 \times 10^3$ to $8.8 \times 10^3$ N/mm$^2$ (approximately 700 to approximately 900 kgf/mm$^2$). Fine burrs and chips produced in the collector during the cutting tend to be tangled with the edge faces on crossing surfaces between the upper blades and the lower blades. When the upper blades and the lower blades have their respective hardnesses in the above range, it is feasible to adequately suppress occurrence of fine deformation in the upper blades and the lower blades, and it is thus feasible to make very small a space (relief space) which the burrs and chips can enter between the upper blades and the lower blades. For this reason, it is feasible to reduce the burrs moving along the edge faces and remaining on the collector, and the chips adhering to the edge faces.

If the hardness of the upper blades or the lower blades is less than $6.9 \times 10^3$ N/mm$^2$, durability of the blades will degrade to make burrs and chips likely to be produced on the cut surfaces of the collector. Since chips are likely to be produced, it becomes easier to cause adhesion of chips to the edge faces.

On the other hand, if the hardness of the upper blades or the lower blades exceeds $8.8 \times 10^3$ N/mm$^2$, chips will tend to adhere to the edge faces. Since it becomes difficult to cut or polish the edge faces, it will be difficult to adjust the surface roughness of the edge faces.

In the slitter apparatus of the present invention, the surface roughnesses of the upper blades and the lower blades are not more than 4 μm. When the upper blades and the lower blades have their respective surface roughnesses in the above range, it is feasible to adequately suppress adhesion of fine chips entering the clearance between edge faces, to the edge faces. If the surface roughness of the upper blades or the lower blades exceeds 4 μm, the chips will be held by unevenness of the edge faces and the burrs of the collector will be held by unevenness of the edge faces, whereby the burrs and chips can enter the space between the upper blades and the lower blades.

Since the upper blades and the lower blades have the aforementioned hardnesses and surface roughnesses while keeping the difference of not more than $4.9 \times 10^2$ N/mm$^2$ (50 kgf/mm$^2$) between the hardnesses of the upper blades and the lower blades and the difference of not more than 2 μm between the surface roughnesses, it is feasible to prevent abrasion of the edge faces at engagement portions between the upper blades and the lower blades. Since it becomes feasible to prevent the abrasion between the edge faces, the present invention can further enhance the effect of preventing the production of chips and the adhesion thereof to the edge faces. Therefore, the slitter apparatus of the present invention is able to adequately suppress the adhesion of chips of the collector to the edge faces and to adequately suppress the production of burrs at the cut surfaces of the collector, during the cutting of the sheetlike electrode. Furthermore, since the adhesion of chips to the edge faces is well suppressed in the slitter apparatus of the present invention, it is feasible to increase the life of the upper blades and the lower blades.

The present invention also provides an electrode production method comprising: an active-material-containing layer forming step of applying an electrode-forming coating solution containing an electrode active material, a binder capable of binding the electrode active material, and a liquid capable of dissolving or dispersing the binder, onto a sheetlike collector, and thereafter removing the liquid to form an active-material-containing layer on the collector, thereby obtaining a sheetlike electrode; and an electrode forming step of cutting the sheetlike electrode with the slitter apparatus as defined in Claim 1 or 2, to obtain an electrode.

Since the electrode production method involves the step of cutting the sheetlike electrode with the slitter apparatus of the present invention as described above, it can adequately suppress the production of burrs in the collector. Therefore, the electrode production method of the present invention permits us to obtain the electrode that can adequately suppress occurrence of an internal short circuit due to the burrs of the collector, when used in fabrication of an electrochemical device.

The slitter apparatus of the present invention is able to adequately suppress the adhesion of chips of the collector to the edge aces and to adequately suppress the production of burrs at the cut surfaces of the collector, during the cutting of the sheetlike electrode. The electrode production method of the present invention is able to adequately suppress the production of burrs in the collector and thereby to obtain the electrode capable of adequately suppressing occurrence of an internal short circuit, when used in fabrication of an electrochemical device.

DESCRIPTION OF THE PREFERRED EMBODIMENTS

The preferred embodiments of the present invention will be described below in detail with reference to the drawings. Identical or equivalent portions will be denoted by the same reference symbols in the following description, without redundant description.

Figure 1:
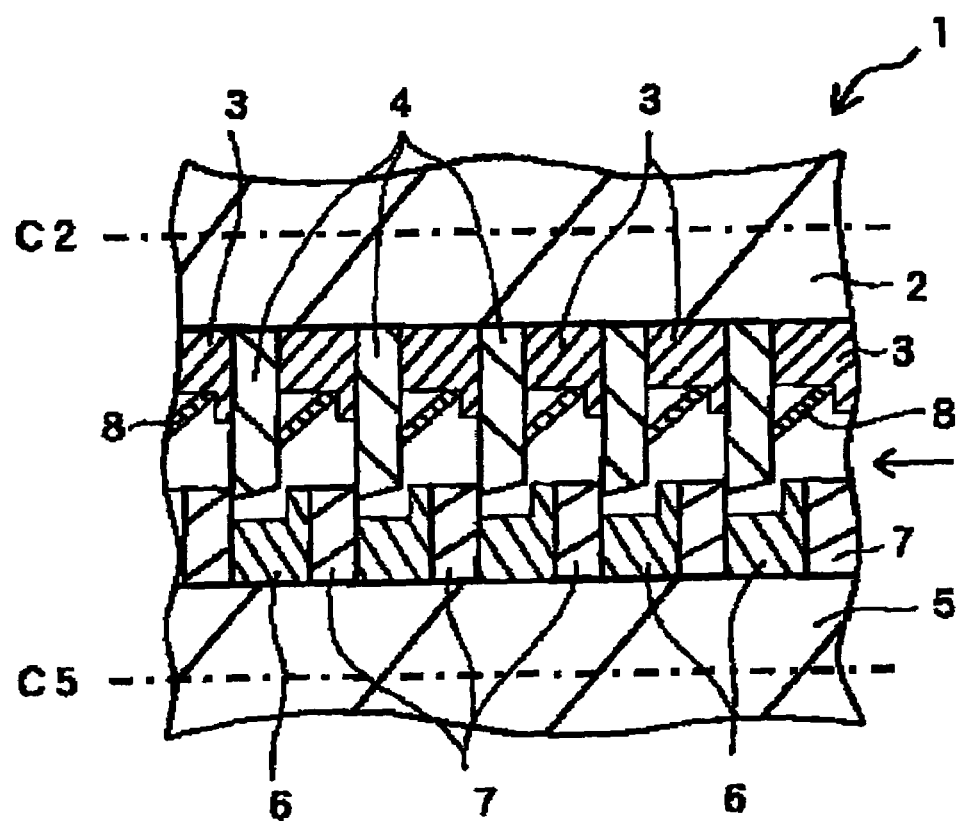
FIG. 1 is a schematic sectional view showing the major part of a preferred embodiment of the slitter apparatus of the present invention.
Figure 2:
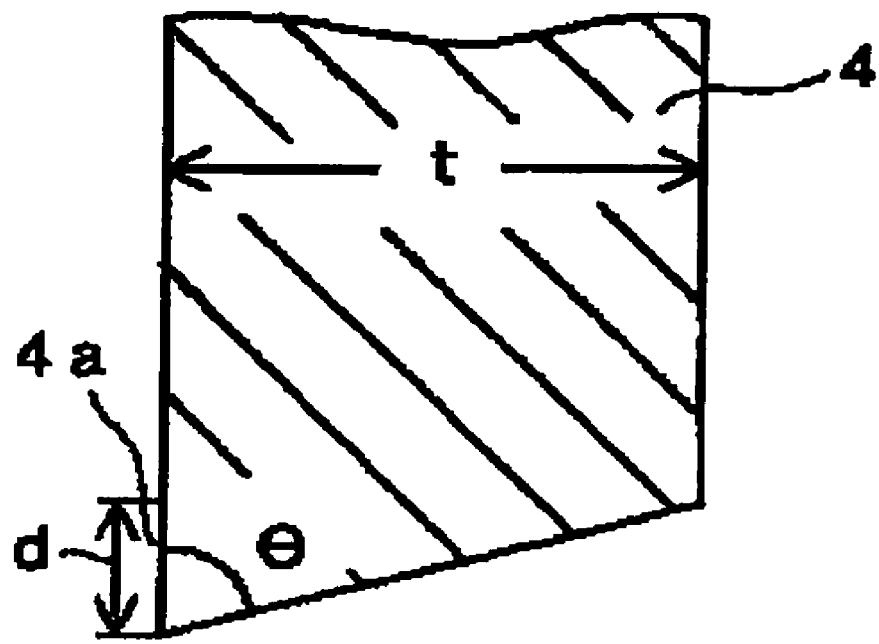
FIG. 2 is a schematic sectional view showing an edge tip shape of an upper blade used in the slitter apparatus of the present invention.
Figure 3:
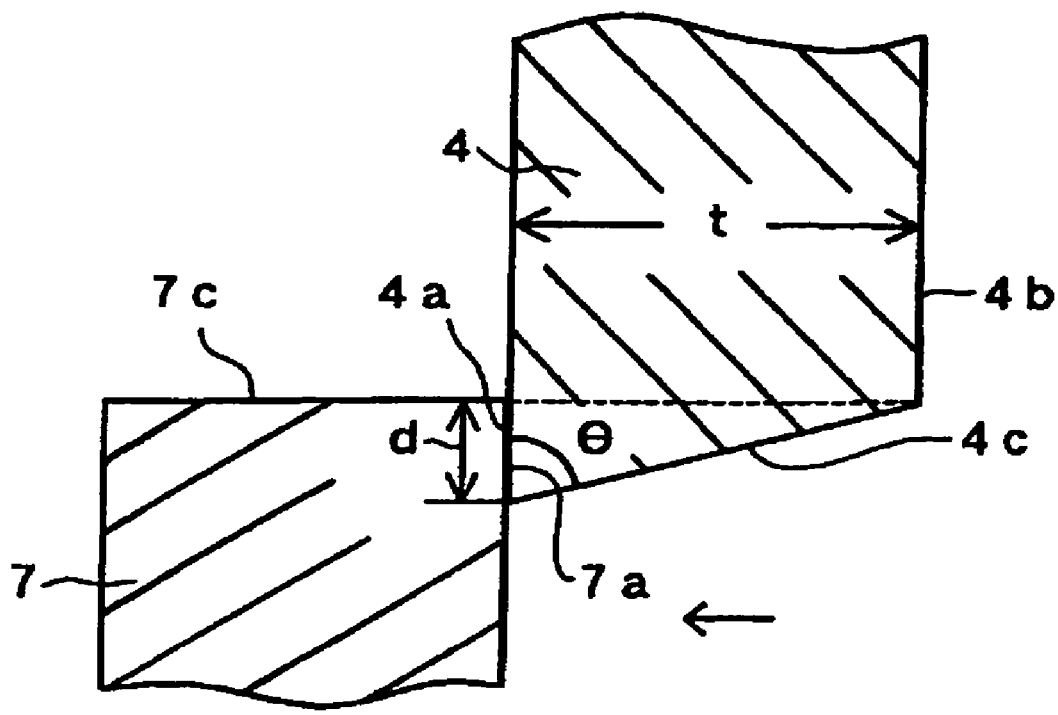
FIG. 3 is a schematic sectional view showing engagement between an upper blade and a lower blade used in the slitter apparatus of the present invention.

FIG. 1 is a schematic sectional view showing the major part of a preferred embodiment of the slitter apparatus of the present invention, FIG. 2 a schematic sectional view showing an edge tip shape of an upper blade used in the slitter apparatus of the present invention, and FIG. 3 a schematic sectional view showing engagement between an upper blade and a lower blade used in the slitter apparatus of the present invention.

In the slitter apparatus 1 of the present invention, as shown in FIGS. 1 to 3, circular upper blades 4 are mounted at predetermined intervals on a rotary shaft 2 (axis: C2), and a spacer 3 having a predetermined width in the longitudinal direction of the rotary shaft 2 is placed between adjacent upper blades 4. Circular lower blades 7 are mounted at predetermined intervals on a rotary shaft 5 (axis: C5), and a spacer 6 having a predetermined width in the longitudinal direction of the rotary shaft 5 is placed between adjacent lower blades 7. The rotary shaft 2 and the rotary shaft 5 are arranged in parallel with each other and at such a spacing as to achieve a predetermined engagement depth d with contact between side face 4a of peripheral part of the upper blades 4 and side face 7a of peripheral part of lower blades 7. Furthermore, the upper blades 4 are biased to the left in FIGS. 1 and 3 (in the direction of an arrow in FIGS. 1 and 3) by leaf spring 8, so as to achieve good engagement in a constant contact state between side face 4a of peripheral part of upper blades 4 and side face 7a of peripheral part of lower blades 7.

In the slitter apparatus 1 of the present invention, the upper blades 4 and the lower blades 7 to be used are those wherein their hardnesses both are in the range of $6.9 \times 10^3$ to $8.8 \times 10^3$ N/mm² and wherein their surface roughnesses are not more than 4 μm. The upper blades 4 and the lower blades 7 are used in such a combination that the difference between the hardness of the upper blades 4 and the hardness of the lower blades 7 is not more than $4.9 \times 10^2$ N/mm² and the difference between the surface roughness of the upper blades 4 and the surface roughness of the lower blades 7 is not more than 2 μm. With provision of such upper blades 4 and lower blades 7, the slitter apparatus 1 is able to adequately suppress the adhesion of chips of the collector to the edge faces and to adequately suppress the production of burrs at the cut surfaces of the collector, during the cutting of the sheetlike electrode.

In terms of more securely achieving the above effect, it is preferable to keep the surface roughnesses of the upper blades 4 and the lower blades 7 in the range of 2 to 4 μm.

There are no particular restrictions on the material of the upper blades 4 and lower blades 7 as long as the foregoing conditions for hardnesses and surface roughnesses are met. For example, the material can be selected from die steels such as SKD11, high speed steels such as SKH, carbide steels, and so on. Among these, it is preferable to use a die steel or a high speed steel, because they can securely satisfy the foregoing conditions for hardnesses and surface roughnesses and better suppress the production of burrs of the collector and the adhesion of chips to the surfaces of the blades during the cutting of the sheetlike electrode. The upper blades 4 and the lower blades 7 are preferably made of the same material.

The upper blades 4 and lower blades 7 are those formed, for example, by annealing a commercially available material such as SKD11 and polishing the surface thereof. By adjusting the temperature, treatment time, cooling speed, etc. during the annealing, it is feasible to obtain the upper blades 4 and lower blades 7 having the hardnesses in the aforementioned range. Specifically, the upper blades 4 and lower blades 7 having the hardnesses in the range of $6.9 \times 10^3$ to $8.8 \times 10^3$ N/mm² can be obtained, for example, by heating SKD11 at 600° C., keeping it at 600° C. for two hours, and thereafter cooling it at the cooling speed of 6-12° C./min. The upper blades 4 and lower blades 7 having the surface roughnesses in the aforementioned range can be obtained by adjusting polishing conditions. Specifically, the upper blades 4 and lower blades 7 having the surface roughnesses of not more than 4 μm can be obtained, for example, by polishing annealed SKD11 with a paste containing diamond abrasive grains having the average particle size of about 30 μm.

In the slitter apparatus 1 of the present invention, the upper blades 4 have the thickness t of not less than 1 mm and the included angle θ in the range of 75 to 88°.

If the thickness t of the upper blades 4 is less than 1 mm, there will arise the same problem as in the conventional shear method, i.e., the problem that burrs are likely to be produced at the cut surfaces of the collector during the cutting of the sheetlike electrode. If the included angle θ is less than 75°, aluminum will be likely to adhere to the side faces of upper blades 4 during cutting of the aluminum collector and chipping (edge breakage) will be likely to occur in the upper blades 4. On the other hand, if the included angle θ exceeds 88°, penetration of the upper blades 4 into the active-material-containing layer will be inadequate, and elongation of the collector will occur to result in making large burrs of the collector at the cut surfaces and producing powder (chips). The included angle θ is preferably in the range of 80 to 85°.

There are no particular restrictions on the thickness of the lower blades 7, but the thickness of the lower blades 7 is preferably in the range of about 5 to 20 mm.

Furthermore, in the slitter apparatus 1 of the present invention, the upper blades 4, in cross section, have the engagement depth d with the lower blades 7 preferably in the range of 200 to 400 µm and more preferably in the range of 250 to 350 µm.

The upper blades 4 are preferably those satisfying the relation of Eq (1) below among thickness t, included angle θ, and engagement depth d:

$$\tan \theta = t/d \quad (1)$$

Therefore, the thickness t of the upper blades 4 is preferably a value satisfying the relation of tan θ=t/d, and thus varies depending upon θ and d. The thickness t of the upper blades 4 is preferably in the range of 1 to 12 mm, more preferably in the range of 1.1 to 5 mm, and particularly preferably in the range of 1.7 to 4 mm.

The upper blades 4 satisfying the above relation of Eq (1) are constructed, as shown in FIG. 3, in such a structure that a slope surface 4c of the edge part of upper blades 4 is formed from a contact surface 4a with a side face 7a of the peripheral part of lower blade 7, to a surface 4b on the opposite side to the contact surface 4a and up to a horizontal height position at the same level as a peripheral end face 7c of lower blade 7.

With provision of the upper blades 4 having the edge shape as described above, the slitter apparatus 1 of the present invention is able to adequately suppress the adhesion of aluminum to the side faces of the upper blades and to adequately suppress the production of burrs of the collector, even during the cutting of the electrode with the collector of aluminum foil. During cutting of the electrode with the collector of metal foil except for aluminum foil, e.g. of copper foil, it is also feasible to adequately suppress adhesion of metal to the side faces of the upper blades and production of burrs of the collector.

Figure 4:
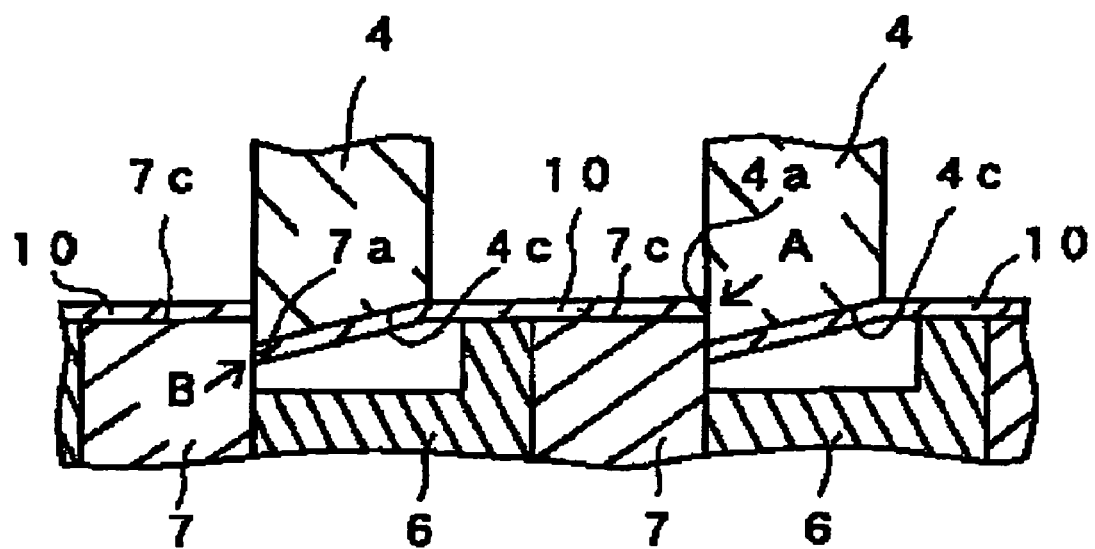
FIG. 4 is a schematic sectional view for explaining a state of cutting of a sheetlike electrode with the slitter apparatus of the present invention.

A state of cutting a sheetlike electrode with the slitter apparatus of the present invention will be described below with reference to FIG. 4. FIG. 4 is a schematic sectional view for explaining a state of cutting a sheetlike electrode with the slitter apparatus of the present invention. As shown in FIG. 4, a sheetlike electrode 10 having been conveyed is cut by shear force, at engagement positions between the upper blades 4 and the lower blades 7 both under rotation. A strip of the sheetlike electrode 10 obtained by the cutting comes to have two cut surfaces, i.e., a cut surface A in contact with the side face 4a of upper blade 4 and a cut surface B in contact with the side face 7a of lower blade 7. Since the upper blades 4 and lower blades 7 satisfy the aforementioned relations of hardnesses and surface roughnesses, it is feasible to adequately suppress the production of burrs of the collector and the adhesion of chips to the surfaces of the blades during cutting of the sheetlike electrode 10, whereby the production of burrs of the collector is suppressed on both of the cut surface A and cut surface B. Since the slope surface 4c in the edge tip part of the upper blades 4 exists up to the horizontal height position at the same level as the peripheral end face 7c of the lower blades 7, it functions to guide the sheetlike object 10, thereby achieving smooth and appropriate cutting.

An electrode production method with the slitter apparatus 1 of the present invention will be described below.

In the electrode production method of the present invention, the first step is to mix an electrode active material, a binder capable of binding the electrode active material, and a liquid capable of dissolving or dispersing the binder, to prepare an electrode-forming coating solution.

Here the electrode active material differs depending upon types of electrochemical devices; for example, in a case where an electrochemical device is an electric double layer capacitor, the electrode active material to be used is particles of a porous material with electron conductivity to contribute to storage and discharge of charge. The particles of the porous material are, for example, activated charcoals of grain shape or fiber shape after an activation treatment. More specific examples of the activated charcoals include phenolic activated charcoal, coconut shell activated charcoal, and so on. In the present invention the term "capacitor" has the same meaning as "condenser."

In the case where the electrochemical device is a lithium ion secondary battery, the electrode active material to be used is different between the anode and the cathode as an electrode. Where the electrode is the anode, the electrode active material is selected, for example, from carbon materials such as graphite, hardly graphitizable carbon, easily graphitizable carbon, and low-temperature calcined carbon capable of storing and releasing lithium ions (i.e., capable of intercalating and deintercalating lithium ions, or capable of being doped and dedoped therewith), metals capable of reacting with lithium, such as Al, Si, and Sn, amorphous compounds consisting primarily of an oxide, such as $SiO_2$ and $SnO_2$, lithium titanate ($Li_3Ti_5O_{12}$), and so on.

In the case where the electrode is the cathode, the electrode active material is selected, for example, from lithium cobalt oxide ($LiCoO_2$), lithium nickel oxide ($LiNiO_2$), lithium manganese oxide spinel ($LiMn_2O_4$), and composite metal oxides represented by the general formula: $LiNi_xMn_yCo_zO_2$ (x+y+z=1) and from lithium vanadium compounds, $V_2O_5$, olivine $LiMPO_4$ (where M represents Co, Ni, Mn, or Fe), lithium titanate ($Li_3Ti_5O_{12}$), and so on. The average particle size of these metal oxides is preferably about 1 to 40 µm.

The "anode" and "cathode" in the present invention are determined on the basis of the polarities during discharge of the electrochemical device.

There are no particular restrictions on the foregoing binder as long as it can bind the electrode active material. It can be selected from various binders such as crystalline resins and noncrystalline resins used heretofore. For example, the binder can be selected from polyacrylonitrile (PAN), polyethylene terephthalate, fluorocarbon resins such as polyvinylidene fluoride (PVDF), polyvinyl fluoride, and fluorocarbon rubber, and so on.

The binder is used normally in the amount of 1 to 40 parts by mass, preferably 2 to 25 parts by mass, and particularly preferably 5 to 15 parts by mass, relative to 100 parts by mass of the electrode active material.

There are no particular restrictions on the foregoing liquid as long as it can dissolve or disperse the binder. It can be one of various solvents used heretofore in preparation of the electrode-forming coating solution. For example, it can be selected from N-methylpyrrolidone (NMP), methyl isobutyl ketone (MIBK), methyl ethyl ketone (MEK), cyclohexanone, toluene, and so on.

An electric conduction aid may be optionally added in the electrode-forming coating solution, for such purposes as complementing the electron conductivity of the electrode active material. There are no particular restrictions on the electric conduction aid as long as it has the electron conductivity. The electric conduction aid can be selected from a variety of well-known electric conduction aids, for example, acetylene black, graphite, fine particles of gold, silver, and copper, and so on.

Furthermore, a variety of well-known additives such as lithium carbonate, oxalic acid, and maleic acid may be optionally added in the electrode-forming coating solution.

Mixing of these electrode active material, binder, liquid, and the electric conduction aid and others optionally added can be performed by one of well-known methods. For example, they can be mixed under dry air or under an inert gas atmosphere by the roll mill method. This allows us to prepare the electrode-forming coating solution.

The next step is to apply the resultant electrode-forming coating solution onto a collector of sheet shape (belt shape). The application may be conducted on the both surfaces of the collector or on only one surface thereof in accordance with the purpose of the electrode. Where the coating solution is applied onto the both surfaces of the collector, it may be simultaneously applied onto the both surfaces and then dried to remove the liquid in the coating solution, or it may be applied onto one surface and dried, and then applied onto the other surface and dried.

In the present invention the collector to be used is metal foil, a metal sheet, punching metal, metal mesh, or the like. Among these, it is preferable to use the metal foil or punching metal. There are no particular restrictions on the metal material of the collector. The metal material can be one of various metal materials used heretofore for the collector. Such metal materials include, for example, copper, aluminum, stainless steel, nickel, iron, and so on, and metal materials preferably used are copper, aluminum, and so on. The thickness of the collector is normally 1-30 µm and preferably 5-20 µm.

The application of the electrode-forming coating solution onto the collector can be carried out by one of well-known application methods; for example, such coating methods as extrusion coat, gravure coat, reverse roll coat, dip coat, kiss coat, doctor coat, knife coat, curtain coat, nozzle coat, and screen printing.

Figure 5:
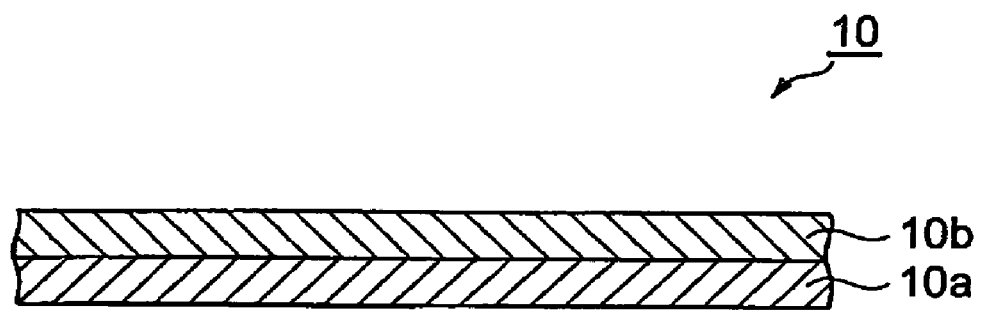
FIG. 5 is a schematic sectional view of a sheetlike electrode.

After the electrode-forming coating solution is applied onto the collector, it is dried to remove the liquid in the coating solution. The drying can be performed by one of well-known methods and, for example, under the drying conditions of 30-150° C. and approximately 5 to 15 minutes. The active-material-containing layer 10b is formed in this manner on one surface or on the both surfaces of the collector 10a as shown in FIG. 5.

In the electrode production method of the present invention, after the removal of the liquid by drying, the collector with the active-material-containing layer is rolled with a roller press machine or the like to make the thickness of the active-material-containing layer thin and constant and to increase the density of the active material per unit volume of the electrode. The pressure in this press operation is approximately 5-1000 kg/cm.

There are no particular restrictions on the thickness of the active-material-containing layer because it depends upon usage; for example, the thickness is approximately 40-400 µm.

The active-material-containing layer 10b is formed on the collector 10a as described above, thereby completing the production of the sheetlike electrode 10 (active-material-containing layer forming step).

Next, the resultant sheetlike electrode is cut in a predetermined size (electrode forming step). The cutting is normally comprised of a slitting step of cutting the sheetlike electrode in a predetermined width along the direction of flow of production, and a clipping step of cutting the electrode in a predetermined length. In the present invention, the slitting step may be carried out prior to the aforementioned rolling 0 process with the roller press machine or the like, and the rolling process is then carried out after the slitting step.

In the slitting step, the conveyance speed of the sheetlike electrode can be set in the range of approximately 5 to 150 m/min and the tension of the sheetlike electrode in the range of approximately 1-50 kg/electrode width.

In the present invention, the cutting of the sheetlike electrode is carried out using the slitter apparatus 1 of the present invention described above. The use of this slitter apparatus 1 makes it feasible to adequately suppress the production of burrs in the collector. Therefore, the electrode production method of the present invention permits us to obtain the electrode capable of adequately suppressing occurrence of an internal short circuit due to the burrs of the collector or the like, when used in fabrication of an electrochemical device.

The preferred embodiments of the slitter apparatus and the electrode production method of the present invention were described above in detail, but it is noted that the present invention is by no means intended to be limited to the above embodiments. Namely, the slitter apparatus of the present invention may be arranged to use linear lower blades as the lower blades 7. In this case, the rotary shaft 2 provided with one or more circular upper blades 4 at predetermined intervals is arranged in parallel with a shaft provided with one or more linear lower blades at predetermined intervals and in parallel, and arranged to be normal to the edge faces of the lower blades. When the slitter apparatus of this configuration is constructed so that the upper blades and lower blades satisfy the aforementioned conditions for hardnesses and surface roughnesses, it is also able to adequately suppress the adhesion of chips of the collector to the edge faces and to adequately suppress the production of burrs to the cut surfaces of the collector, during the cutting of the sheetlike electrode.

The above embodiment described the case where the slitter apparatus 1 had the plurality of upper blades 4 and lower blades 7, but the slitter apparatus of the present invention may also be arranged to have a single upper blade 4 and a single lower blade 7.

EXAMPLES

The present invention will be more specifically described on the basis of Examples and Comparative Examples, but it is noted that the present invention is by no means limited to the examples below.

Examples 1-2 and Comparative Examples 1-8

Slitters of Examples 1-2 and Comparative Examples 1-8 were fabricated as slitter apparatus having much the same configuration as that shown in FIG. 1, using the upper blades and lower blades having the hardnesses and surface roughnesses presented in Table 1. The hardnesses herein were determined with a Vickers hardness tester equipped with a diamond square-based pyramid indenter (HMV-FA available from Shimadzu Corporation) by measuring hardnesses at twenty points and calculating an arithmetic average of measurement results. The surface roughnesses were determined with a stylus type surface roughness tester (Talystep available from Taylor Hobson K. K.) and from a surface roughness profile obtained through scan along 2 mm on the edge face. The upper blades were those having the thickness (t) of 3.41 mm, the diameter of 10.5 mm, the included angle ($\theta$) of 8.5°, and the engagement depth (d) of 300 µm with the lower blade, and were arranged at intervals of 50 mm between adjacent upper blades. The lower blades were those having the thickness of 10 mm and the diameter of 80 mm and were arranged so as to correspond to the arrangement intervals of the upper blades.

TABLE 1

|  | UPPER BLADES | | LOWER BLADES | | DIFFERENCE BETWEEN HARDNESSES OF UPPER BLADES AND LOWER BLADES [N/mm$^2$] | DIFFERENCE BETWEEN SURFACE ROUGHNESSES OF UPPER BLADES AND LOWER BLADES [μm] |
|---|---|---|---|---|---|---|
|  | HARDNESS [N/mm$^2$] | SURFACE ROUGHNESS [μM] | HARDNESS [N/mm$^2$] | SURFACE ROUGHNESS [μm] | | |
| EXAMPLE 1 | $7.3 \times 10^3$ | 2.5 | $7.3 \times 10^3$ | 2.5 | 0 | 0 |
| EXAMPLE 2 | $8.5 \times 10^3$ | 2.5 | $8.5 \times 10^3$ | 2.5 | 0 | 0 |
| COMPARATIVE EXAMPLE 1 | $9.6 \times 10^3$ | 2.3 | $9.6 \times 10^3$ | 2.3 | 0 | 0 |
| COMPARATIVE EXAMPLE 2 | $6.8 \times 10^3$ | 2.4 | $6.8 \times 10^3$ | 2.4 | 0 | 0 |
| COMPARATIVE EXAMPLE 3 | $7.3 \times 10^3$ | 2.5 | $9.6 \times 10^3$ | 2.3 | 240 | 0.2 |
| COMPARATIVE EXAMPLE 4 | $8.5 \times 10^3$ | 2.5 | $6.8 \times 10^3$ | 2.4 | 180 | 0.1 |
| COMPARATIVE EXAMPLE 5 | $7.3 \times 10^3$ | 2.5 | $7.4 \times 10^3$ | 5.1 | 10 | 2.6 |
| COMPARATIVE EXAMPLE 6 | $8.5 \times 10^3$ | 2.5 | $8.6 \times 10^3$ | 6.7 | 10 | 4.2 |
| COMPARATIVE EXAMPLE 7 | $7.4 \times 10^3$ | 5.1 | $7.4 \times 10^3$ | 5.1 | 0 | 0 |
| COMPARATIVE EXAMPLE 8 | $8.6 \times 10^3$ | 6.7 | $8.6 \times 10^3$ | 6.7 | 0 | 0 |

(Cutting Tests)

A cutting test of intermittently cutting aluminum foil 200 μm thick by the length of 150 m was conducted using each of the slitters fabricated in Examples 1-2 and Comparative Examples 1-8. After the cutting test, twenty regions were arbitrarily selected within 5 mm from the edge faces of the upper blades and lower blades, the edge faces were observed with an optical microscope (magnification: ×50), and it was checked whether aluminum adhered to the edge faces. Table 2 presents the numbers of defectives with which adhesion of aluminum was observed. Twenty pieces of aluminum foil cut by the cutting tests were arbitrarily selected and the cut surfaces of the aluminum foil pieces were observed with an optical microscope (magnification: ×50) to check whether burrs were produced in the aluminum foil pieces. Table 2 presents the numbers of defectives with which burrs were observed on the cut surfaces.

TABLE 2

|  | NUMBER OF ADHESION DEFECTIVES | NUMBER OF BURR DEFECTIVES |
|---|---|---|
| EXAMPLE 1 | 2 | 0 |
| EXAMPLE 2 | 3 | 1 |
| COMPARATIVE EXAMPLE 1 | 18 | 6 |
| COMPARATIVE EXAMPLE 2 | 20 | 7 |
| COMPARATIVE EXAMPLE 3 | 19 | 14 |
| COMPARATIVE EXAMPLE 4 | 17 | 16 |
| COMPARATIVE EXAMPLE 5 | 18 | 19 |
| COMPARATIVE EXAMPLE 6 | 17 | 20 |
| COMPARATIVE EXAMPLE 7 | 18 | 18 |
| COMPARATIVE EXAMPLE 8 | 19 | 19 |

As apparent from the results presented in Table 2, it was confirmed that the slitters of Examples 1 and 2 were able to adequately suppress the adhesion of aluminum to the edge faces and to adequately suppress the production of burrs on the cut surfaces of aluminum foil during the cutting of aluminum foil.

The above confirmed that the slitter apparatus of the present invention was able to adequately suppress the adhesion of chips to the edge faces and the production of burrs on the cut surfaces of the collector, during cutting of the sheetlike electrode.

What is claimed is:

1. An electrode production method comprising:
    an active-material-containing layer forming step of applying an electrode-forming coating solution containing an electrode active material, a binder capable of binding the electrode active material, and a liquid capable of dissolving or dispersing the binder, onto a collector sheet, and thereafter removing the liquid to form an active-material-containing layer on the collector, thereby obtaining an electrode sheet; and
    an electrode forming step of cutting the electrode sheet with a slitter apparatus to obtain an electrode, the slitter apparatus comprising:
    a rotary shaft provided with one or more circular upper blades at a predetermined interval, and a rotary shaft provided with one or more circular lower blades at a predetermined interval, the rotary shafts being arranged in parallel with each other and at such a spacing as to achieve a predetermined engagement depth with contact between a side face of a peripheral part of the upper blades and a side face of a peripheral part of the lower blades,
    wherein a thickness of the upper blades is not less than 1 mm,
    wherein an included angle of the upper blades is in a range of 75 to 88°,
    wherein hardnesses of the upper blades and the lower blades are in a range of $6.9 \times 10^3$ to $8.8 \times 10^3$ N/mm$^2$, and a difference between the hardness of the upper blades and the hardness of the lower blades is not more than $4.9 \times 10^2$ N/mm$^2$, and
    wherein surface roughnesses of the upper blades and lower blades are not more than 4 μm, and a difference between the surface roughness of the upper blades and the surface roughness of the lower blades is not more than 2 μm.

2. An electrode production method comprising:

an active-material-containing layer forming step of applying an electrode-forming coating solution containing an electrode active material, a binder capable of binding the electrode active material, and a liquid capable of dissolving or dispersing the binder, onto a collector sheet, and thereafter removing the liquid to form an active-material-containing layer on the collector, thereby obtaining an electrode sheet; and an electrode forming step of cutting the electrode sheet with a slitter apparatus to obtain an electrode, the slitter apparatus comprising:

a rotary shaft provided with one or more circular upper blades at a predetermined interval, and a shaft provided with one or more linear lower blades at a predetermined interval and in parallel, and arranged to be normal to edge faces of the lower blades, the shafts being arranged in parallel with each other and at such a spacing as to achieve a predetermined engagement depth with contact between a side face of a peripheral part of the upper blades and a side face of a peripheral part of the lower blades, wherein a thickness of the upper blades is not less than 1 mm, wherein an included angle of the upper blades is in a range of 75 to 88°, wherein hardnesses of the upper blades and the lower blades are in a range of $6.9 \times 10^3$ to $8.8 \times 10^3$ $N/mm^2$, and a difference between the hardness of the upper blades and the hardness of the lower blades is not more than $4.9 \times 10^2$, and wherein surface roughnesses of the upper blades and the lower blades are not more than 4 μm, and a difference between the surface roughness of the upper blades and the surface roughness of the lower blades is not more than 2 μm.

* * * * *